July 2, 1940.  W. N. JUSTICE  2,206,256
FRANKFURTER AND METHOD OF TENDERIZING THE SAME
Filed Jan. 11, 1939  2 Sheets-Sheet 1
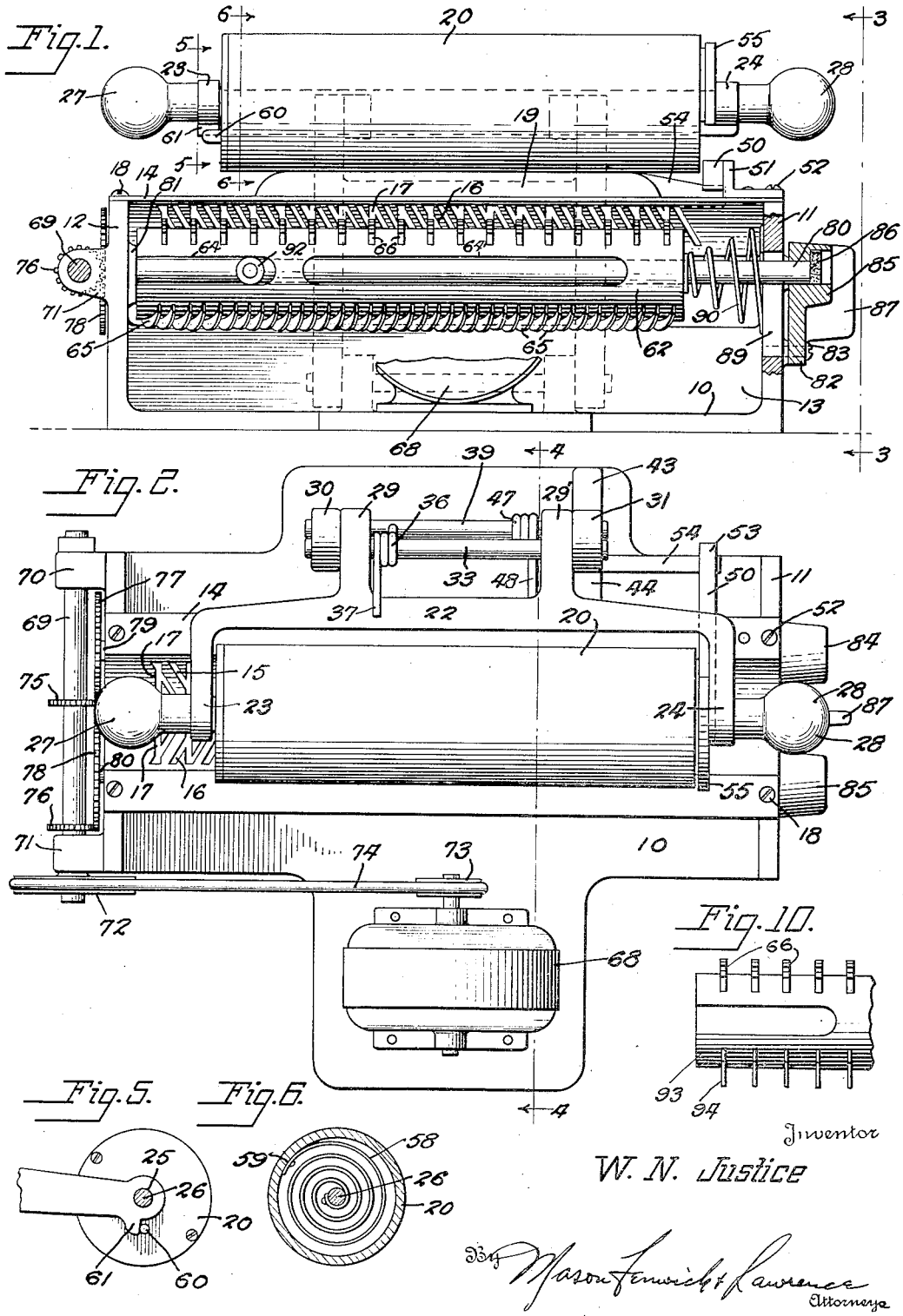
Inventor
W. N. Justice
By Mason Fenwick & Lawrence
Attorneys July 2, 1940.   W. N. JUSTICE   2,206,256
FRANKFURTER AND METHOD OF TENDERIZING THE SAME
Filed Jan. 11, 1939   2 Sheets-Sheet 2
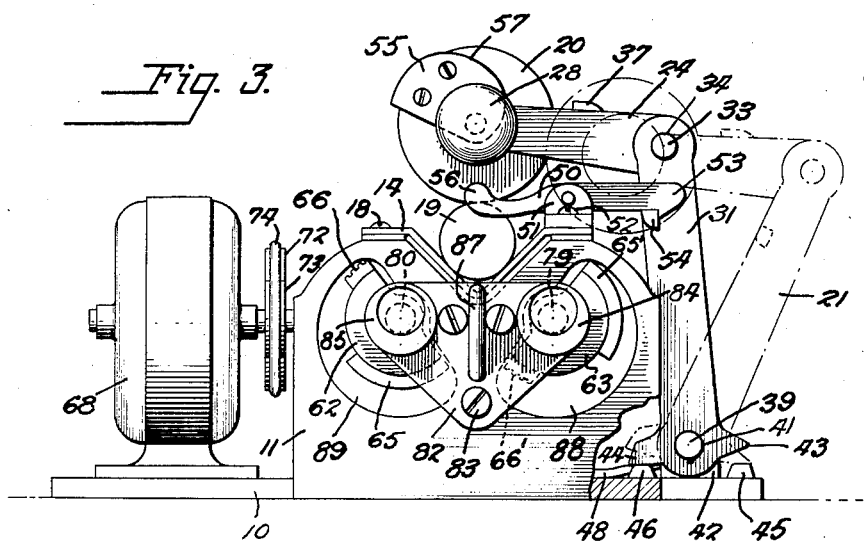
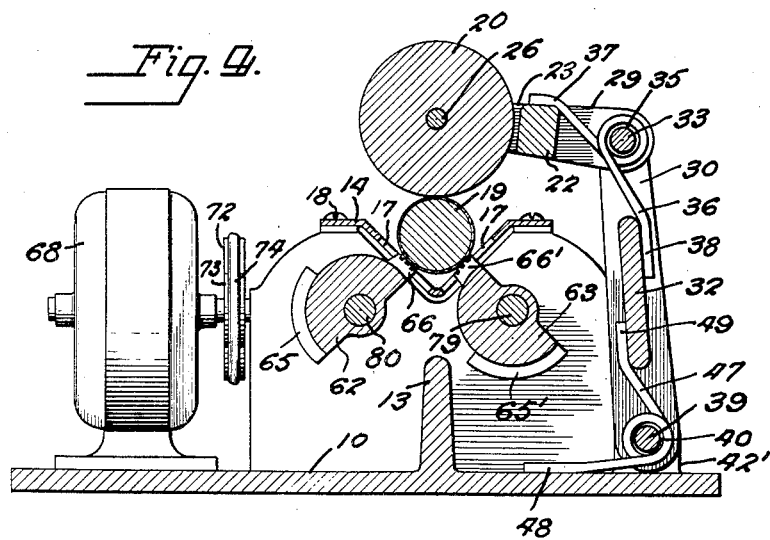
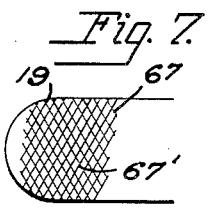
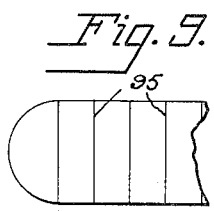
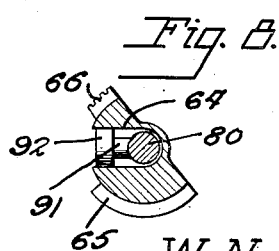
Inventor
W. N. Justice
By Mason Fenwick & Lawrence
Attorneys Patented July 2, 1940

2,206,256

UNITED STATES PATENT OFFICE 2,206,256

FRANKFURTER AND METHOD OF TENDERIZING THE SAME

William N. Justice, Baltimore, Md.

Application January 11, 1939, Serial No. 250,448

7 Claims. (Cl. 99—107)

This invention relates to frankfurter tenderizers and more particularly to method, means and resulting product.

Frankfurters are of two kinds, those which have an animal skin casing, and frankfurters of the socalled "skinless" type. The former have the best flavor for it is not practical to use so large a proportion of pork in the "skinless" frankfurter due to the deteriorative action of the grease upon the cellulose or gelatine covering the "skinless" sausage. The skin jacketed frankfurters, however, have the drawback that they are tougher than those of the "skinless" type and it is the principal object of the present invention to tenderize the skin of the frankfurter by subjecting it to a treatment which divides the skin into a plurality of small areas which do not require to be chewed.

Another object of the invention is the provision of a frankfurter of the skin jacketed type in which the skin is divided into a plurality of separate areas through the instrumentality of a slitting machine or device so that the skin of the frankfurter through the shrinkage incidental to cooking draws away from the slits exposing the meat of the sausage, permitting the exudation of the flavor developed in cooking and which condenses or deposits on the exposed surfaces of the meat in the slits.

Other objects of the invention will appear as the following description of a preferred and practical embodiment thereof proceeds.

In the drawings:

Figure 1 is a front elevation partly in section illustrating a preferred embodiment of this invention;

Figure 2 is a plan view;

Figure 3 is an end elevation taken at the right of Figure 1;

Figure 4 is a transverse, vertical cross section taken on the line 4—4 in Figure 2;

Figure 5 is a detail of the cylinder limit stop;

Figure 6 is a transverse cross section of the cylinder on the line 6—6 of Figure 1;

Figure 7 shows a portion of frankfurter which has been treated in accordance with the present invention;

Figure 8 is a detail view of the cutter drive;

Figure 9 is a side view showing a portion of a frankfurter having the skin circumferentially slitted in planes perpendicular to the axis of the sausage;

Figure 10 is a side elevation showing a portion of a modified form of cutter drum interchangeable with the cutter drums 62 and 63 shown in Figures 1 and 4.

Considering the drawings in greater detail, the device is shown in Figure 1 comprising a frame 10 having upright end posts 11 and 12 and a longitudinally extending rib 13 serving to reinforce and brace the framework. A substantially V-shaped table 14 is removably attached to the upper ends of the standards 11 and 12 and is provided with a series of oppositely, angularly extending slots 15 and 16 as well as a plurality of transversely extending slots 17. The table is fastened by a plurality of screws or other fastening means 18. It is arranged for the reception of a frankfurter 19 which latter is to be treated in accordance with the present invention.

A cylinder 20 is pivotally supported upon the frame and arranged to be normally retracted to the dotted position 21 indicated in Figure 3, but which is arranged to be brought forward so as to rest upon and engage the frankfurter as clearly indicated in the various figures. The cylinder 20 is supported upon a bifurcated bearing yoke 22 having two bearing arms 23 and 24 each having a bearing opening 25 to receive the opposite ends of the cylinder supporting shaft 26. At the outer ends of the shaft 26 are mounted the hand grip members 27 and 28 so that the cylinder may be grasped in its retracted position 21 and drawn upward and forward so as to rest upon the frankfurter. The yoke 22 has rearwardly extending arms 29 and 29' which are pivotally supported upon the upright lever arms 30 and 31 which latter arms may be inter-connected by a bar 32. The yoke and arms are joined by means of the shaft 33 which extends through bearings 34 and 35 in the arms and yoke, respectively.

The arms and yoke are biased into frankfurter engaging position by means of a spring 36 which latter encircles the shaft 33 and has its ends 37 and 38 in engagement with the yoke 22 and the brace 32, respectively. When the cylinder is in its forward position resting upon the frankfurter, this spring maintains a uniform tension to keep the cylinder in engagement with the frankfurter. When the mechanism is released and restored to its dotted line position as seen in Figure 3, the spring also urges the cylinder downwardly. As a result of this action, the cylinder must be raised upwardly and brought forward when it is to be placed upon a frankfurter.

The lower ends of the levers 30 and 31 are pivotally supported upon the base 10 by means of the common shaft 39 extending through bearings 40 and 41 at the lower ends of the respective arms and through the bosses 42 and 42' forming an integral part of the base. The lever 31 is provided with laterally extending wings 43 and 44 which are arranged to engage limit stops 45 and 46 which latter determine the retracted position 21 and the limit of forward movement as shown in Figure 3. The spring 47 which encircles the shaft 39 and has one end 48 engaging the base 10 and its opposite end 49 engaging the brace 42 is so organized that it biases the cylinder supporting arms and yoke toward the dotted position 21 in Figure 3.

In order to hold the cylinder 20 into its forward position during the treatment of a frankfurter, a latch 50 is pivotally mounted on the bracket 51 which latter is fastened by a screw 52 upon the right hand end wall 11. This lever may be either weighted or provided with a spring to hold it substantially in the position indicated in Figure 3. In this position, the outer end 53 of the latch engages an arm 54 which extends laterally from the lever 31. As soon as the cylinder 20 is drawn forward over the frankfurter, the arm 54 is caught under the latch 53 and the parts are retained in the position indicated in Figure 4.

At the right hand end of the cylinder 20 is mounted a cam 55 which is arranged to strike the end 56 of the latch lever 50 and thereby disengage the latch from the arm 54. As soon as this occurs, the spring 47 retracts the cylinder and its supporting members to a position away from the table. The cam surface 57 is so designed that frankfurters of different diameter can be properly treated and the cylinder which holds the frankfurter against the cutters, hereinafter described, will always be released after the frankfurter has made one revolution in turning upon the table. This precludes any possibility of the frankfurter being cut excessively.

In order to have the cam 55 operating always in a definite manner, the cylinder is provided with a restoring spring 58 which is secured at one end of the shaft 26 and at the opposite end 59 to the cylinder 20. The cylinder is also provided with a limit stop 60 on its outer surface. The spring acts in such a manner as to return the cylinder to the initial position viewed in Figure 3 so that the pin 60 will always abut against the limit stop 61 at the beginning of the tenderizing treatment. Rotation of the frankfurter causes a corresponding rotation of the cylinder 20 and the movement of the cam 55 into engagement with the latch 50. After the release of the cylinder, the spring quickly returns the cylinder by bringing the pin against the limit stop.

Positioned beneath the table are a plurality of cutter elements 62 and 63 each of which is substantially semi-cylindrical being cored out at 64 and 64' to reduce weight and at the same time provide slots for power drive. Each cutter is provided with a plurality of angularly extending blades 65 and 65' which are arranged to pass through the corresponding angularly extending slots 15 and 16 in the frankfurter table. The opposite sides of the cutter members are provided with frankfurter raising and rotating elements 66 and 66'. As the cutters rotate in the same direction, being clockwise in Figure 4, with the frankfurter positioned upon the table and held in place by the cylinder 20, the cutter blades form a series of slits 67 and 67', respectively in the skin surface of the frankfurter. Since the cutting blades on the two cutters are disposed in angularly different directions, the slits will extend angularly as viewed in Figure 7. During the continuous rotation, the elements 66, which are arranged to extend slightly above the table surface, engage the frankfurter and raise it above the table and partially rotate it. In view of the peculiar properties of the frankfurter tending to increase its surface friction, it is preferable to raise the frankfurter off of the surface during this turning operation. This series of events is continued until the frankfurter has made one complete revolution, at which time a plurality of series of at least partially overlapping slits will be formed in the surface of the frankfurter as indicated in Figure 7. Another frankfurter may then be placed in the machine and the same sort of treatment again provided.

By the above treatment the skin of the frankfurter is divided into a plurality of small areas, the continuity of the skin being thus broken up so that it offers no resistance to being masticated and has the attribute of tenderness as fully present as in frankfurters of the skinless type. Furthermore, the perforations constituted by the slits afford well distributed means for the escape of steam obviating bursting of the sausage while being cooked. The small areas into which the skin is subdivided by the slitting shrink during cooking imparting a substantial width dimension to the slits exposing merely parts of the meat of the sausage. If the sausage is grilled or otherwise cooked in a dry manner this permits the exudation of the flavor compounds developed in cooking and which condenses or deposits upon the exposed surfaces of the meat in the slits imparting a superior flavor to the sausage. If the frankfurters are cooked in a sauce or with certain vegetables such as sauerkraut, the widened slits permit the absorption of the flavor of the cooking medium into the body of the sausage improving its flavor.

The operation of the device is made automatic by means of a power drive operated from an electric motor 68 mounted upon the base 10. A stub shaft 69, which is supported through bearings mounted on the bosses 70 and 71, carries a drive pulley 72 at one end which latter is driven from the drive pulley 73 mounted on the motor shaft by means of the belt 74. Two spur gears 75 and 76 are mounted transversely on the shaft 69 and keyed thereto and are arranged to engage the spur gears 77 and 78 which are in turn secured on the cutter shafts 79 and 80. These shafts are mounted at one end in the bearings 81 mounted upon the end wall 12 and are supported at the opposite end in a removable bearing bracket 82. This bracket is substantially triangular in shape being secured by appropriate screws 83 to the side wall 11 and having recessed bearing elements 84 and 85 arranged to support these shafts. It is preferable to include in the recessed bearings a felt disk washer 86 which serves to absorb any slight end play in the shaft while at the same time acting as a reservoir for lubricant. The bracket is reinforced by a rib 87 extending vertically upon its outer face. In order to clean the cutters, it is merely necessary to unfasten the three screws 83 and grasping the bracket by means of the rib 87 to lift it to the right thereby exposing the ends of the shafts 79 and 80. It will be observed that the end wall 11 has two semi-circular cut-out portions 88 and 89 which allow a ready removal of the cutters after the bracket has been removed.

A spring 90 is placed about each of the cutter shafts interiorly of the housing and may preferably be in spiral form so as to allow one end to rest against the wall 11 and the opposite end to abut against the right hand end of each cutter. During the operation of the device, as the cutters 65 move through the slotted table 14, the cutter will move to the right against the spring 90. As the cutters continue to rotate and the blades move out of the slots 15 and 16, the spring 90 will immediately move the cutter axially of the shaft to the left. As a result of this movement the frankfurter rotating element 66 will be aligned with the transverse openings 17 so that they may then extend through the table and partially rotate the frankfurter for a further cutting treatment.

Each of the cutter shafts is arranged to extend through the cored opening 64 in the cutters and is provided with a radially extending boss 91 at the outer end of which is mounted a roller 92. It will be noted that the shafts form a sloppy fit within the cutters, in other words, the cutter shafts are of somewhat smaller diameter than the cored openings in the cutters. This allows a limited amount of relative motion between the cutters and shafts. The roller serves as a positive drive between the shaft 80 and the walls of the slots 64 so that the rotation of the motor is transmitted to the cutters by means of the series of gears and the slot and pin connection 64—92. The table is preferably V-shaped in transverse section so as to provide a trough in which the frankfurter rests.

Figure 10 shows a slightly modified form of cutter drum 93 which is interchangeable with drums 62 and 63. It is provided with the sausage lifters 66, identical with those shown in Figure 1, the difference between the cutter drum 93 being that the knives, or blades, 94 lie in planes perpendicular to the axis of the cutter drum instead of inclined thereto. The knives 94 also lie in the same planes as the lifting elements 66 so that they play in the lifter slots 17 and in the inclined slots 60. When the cutter drum 93 is employed it does not have any endwise movement.

The knives 94 produce parallel slits 95 in the skin of the sausage as shown in Figure 9. As a matter of fact the circumferential slits are not continuous, but are produced by the over-lapping of short arcuate slits successively imparted by the step-by-step rotation of the sausage.

What I claim is:

1. A frankfurter having its skin divided by a reticulated pattern of slits whereby sauces and seasonings used in cooking may be absorbed into the sausage and the skin tenderized.

2. A frankfurter having the skin divided into a plurality of small areas by slits, whereby shrinkage of said areas through cooking, imparts substantial width dimension to said slits, permitting exudation of flavoring substances which deposit on the meat surfaces exposed in said slits.

3. The method of tenderizing frankfurters comprises slitting the skin of the frankfurter with a series of parallel slits, the slits of each series being parallel, and the slits of the respective series inclining in opposite directions so as to intersect.

4. A tenderized frankfurter characterized by having the skin thereof slitted so as to divide the skin into a plurality of small areas.

5. The method of tenderizing a frankfurter having an outer skin comprising rolling said frankfurter in cutting relationship to a gang of knives to divide said surface layer by a series of parallel slits.

6. Method of tenderizing a frankfurter having an outer skin comprising rolling said frankfurter in cutting relation to a gang of knives, successively in different directions whereby said surface is divided by series of parallel intersecting slits.

7. A frankfurter having its casing provided with a substantial number of parallel slits extending therethrough and continuously therearound.

WILLIAM N. JUSTICE.